United States Patent
Bechara et al.

(10) Patent No.: US 6,339,125 B1
(45) Date of Patent: Jan. 15, 2002

(54) CATIONIC POLYURETHANE DISPERSION AND COMPOSITION CONTAINING SAME

(75) Inventors: Ibrahim Bechara, Carmel, NY (US); Biau-Hung Chang, Basking Ridge, NJ (US); Pavel Ilmenev, Ridgefield, CT (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/699,821

(22) Filed: Oct. 30, 2000

(51) Int. Cl.$^7$ .................................................. C08L 37/00
(52) U.S. Cl. ...................... 524/589; 524/590; 524/591; 524/839; 524/840
(58) Field of Search .............................. 524/589, 590, 524/541, 839, 840

(56) References Cited

U.S. PATENT DOCUMENTS

| | | |
|---|---|---|
| 4,160,065 A | 7/1979 | Loewrigkeit et al. |
| 4,240,944 A | 12/1980 | Temple |
| 4,507,430 A | 3/1985 | Shimada et al. |
| 4,644,030 A | 2/1987 | Loewrigkeit et al. |
| 4,728,573 A | 3/1988 | Temple |
| 5,389,718 A | 2/1995 | Potter et al. |
| 5,672,653 A | 9/1997 | Frisch et al. |
| 5,696,291 A | 12/1997 | Bechara et al. |
| 5,723,518 A | 3/1998 | Kahl et al. |

FOREIGN PATENT DOCUMENTS

| | | |
|---|---|---|
| EP | 718276 A2 | 6/1996 |
| JP | 10110024 | 4/1998 |

*Primary Examiner*—Edward J. Cain
(74) *Attorney, Agent, or Firm*—Daniel Reitenbach

(57) ABSTRACT

A polyurethane dispersion which is the reaction product of a prepolymer and a water or hydrazine chain extender. The prepolymer is the reaction product of a hydroxylated polyalkadiene, a bis(hydroxyalkyl) quaternary ammonium-group-containing diol and a polyisocyanate.

22 Claims, No Drawings

CATIONIC POLYURETHANE DISPERSION AND COMPOSITION CONTAINING SAME

BACKGROUND OF THE INVENTION

1. Field of the Invention

The present invention is directed to a new class of polyurethane dispersions. More specifically, the present invention is directed to a non-corrosive and non-toxic cationic polyurethane dispersion containing hydrophobic polyolefin segments in its backbone and operable in acidic medium.

2. Description of the Prior Art

The utilization of polyurethane dispersions as adhesives, coatings and sizing agents for glass fibers and mineral fillers is well known. Although polyurethane dispersions are utilizable in the aforementioned applications, a major problem associated with that use in the prior art occurs when the substrate on or into which the polyurethane dispersion is disposed, is a polyolefin. The hydrophobic nature of polyolefins makes bonding of polyurethane dispersion sizing agents, coatings and adhesives difficult due to the polar nature of polyurethane dispersions and the non-polarity of polyolefins.

Another problem known to those skilled in the art is the difficulty of utilizing polyurethane dispersions in acidic media. This problem has been addressed in the prior art with indifferent results. That is, although prior art cationic polyurethane dispersions could be used in acidic media their use was discouraged due to their high toxicity and high corrosivity.

Yet a third problem, in reality a corollary of the problem associated with the hydrophobicity of polyurethane dispersions, is the poor adhesivity of polyurethane dispersion sized fibers and fillers in hydrophobic polymeric matrices. This difficulty in the prior art is particularly pronounced in the case of highly hydrophobic polyolefin matrices. As such, this problem has discouraged the utilization of polyurethane dispersion sizing compositions for fiber and filler employed in the reinforcement of hydrophobic polymeric matrices, especially polyolefins. Obviously, reinforcing fillers and fibers must securely adhere to the polyolefin matrix in order for the reinforcing agent to be effective. Therefore, because of the poor adhesion between polyolefins and polyurethane dispersions, polyurethane dispersion sizing composition have not been utilized in this application.

The above problems have been addressed only in part in the prior art. The preparation of cationic polyurethane dispersions is described in U.S. Pat. Nos. 4,160,065 and 5,561,187. U.S. Pat. No. 4,160,065 discloses a latex prepared in an aqueous system by reacting a quaternized NCO-prepolymer with water and a chain extender. The resulting prepolymer is chain extended by reaction with a difunctional or polyfunctional reagent containing primary amino groups. U.S. Pat. No. 5,561,187 describes the preparation and use of quaternized bis(hydroxyalkyl)amines. These amines are produced by reacting a tertiary amine and an alkylene oxide in a strong acid system.

The modification of polyurethane dispersions with hydroxy-terminated polyolefins has been reported, albeit this modification in cationic polyurethane dispersions is unknown. Specifically, U.S. Pat. Nos. 4,507,430 and 5,672,653 describe anionic polyurethane dispersions containing polyolefin polyols. However, as stated above, the preparation of equivalent cationic dispersions is not reported in the prior art. This is believed due to the excessive hydrophobicity of polyalkaldiene polyols which makes dispersibility in water very difficult. In addition, the functionality of polyalkadiene polyols increases viscosity which increases the possibility of prepolymer gellation.

The aforementioned difficulties in the prior art evidence the strong need in the art for a new class of cationic polyurethane dispersions which are compatible with hydrophobic polymer matrices, are easy to handle, non-corrosive and can be employed in acidic media.

BRIEF SUMMARY OF THE INVENTION

A new class of cationic polyurethane dispersions has now been developed which overcomes the prior art problems of polyurethane dispersions which are incompatible with polyolefin matrices. Moreover, since this new class of polyurethane dispersions is cationic, these dispersions can be employed in acidic media without the attendant problems of toxicity or corrosion. The cationic polyurethane dispersions of the present invention are thus characterized by good adhesion to hydrophobic matrices, especially polyolefins, which have presented problems in the prior art.

In accordance with the present invention a cationic polyurethane dispersion is provided. The cationic polyurethane dispersion of the present invention includes a reaction product of a prepolymer and a chain extender. The prepolymer comprises a reaction product of a hydroxylated polymer selected from the group consisting of hydroxylated polyethers, hydroxylated polyesters and mixtures thereof, a hydroxylated polyalkadiene, a polyisocyanate, a bis (hydroxyalkyl) quaternary ammonium group-containing diol and, optionally, an ester of a hydroxylated fatty acid containing about 12 to about 20 carbon atoms.

DETAILED DESCRIPTION

The present invention is directed to cationic polyurethane dispersions which incorporate therein quaternary ammonium groups. The polyurethane dispersion is prepared by dispersing a prepolymer in water and extending it with water or hydrazine. The prepolymer is formed by reacting, at elevated temperature, a quaternary ammonium group-containing diol with a hydroxylated polyalkadiene, a polyisocyanate and one or more optional components. These optional components include a hydroxylated polymer selected from the group consisting of a polyether polyol, a polyester polyol and mixtures thereof, an ester of a fatty acid containing about 12 to about 20 carbon atoms containing hydroxyl groups and a polyepoxide.

The prepolymer reaction occurs at a temperature in the range of between about 70° C. and about 95° C. over a period of between about 2 and about 5 hours. The reaction continues until the free isocyanate content reaches or comes very close to the calculated value, as determined by standard titration with dibutylamine.

The polyurethane dispersion prepolymer-forming reaction is characterized by the polyisocyanate being reacted in a concentration of between about 30% and about 150% in excess of the stoiciometric concentration required to completely react with the hydroxyl groups. Moreover, the quaternary ammonium group-containing diol is present in a concentration sufficient to provide adequate stability to the polyurethane dispersion in water. The thus formed prepolymer is thereupon dispersed in water under vigorous agitation. A polyurethane dispersion is formed by reacting the free isocyanate end-groups with an appropriate chain extender, such as water or hydrazine, to produce a stable aqueous cationic polyurethane dispersion.

A first component of the prepolymer reaction product of the present invention is a hydroxylated polyalkadiene. The hydroxylated polyalkadiene may or may not be hydrogenated. Moreover, if the hydroxylated polyalkadiene is hydrogenated, the degree of hydrogenation may be partial or complete. Although the degree of hydroxylation is limited only by the minimum presence of two hydroxyl groups, it is indeed preferred that the hydroxylated polyalkadiene be a diol.

Of the hydroxylated polyalkadienes within the contemplation of the present invention hydroxylated polybutadiene is preferred. Thus, a particularly preferred hydroxylated polyalkadiene is a diol of polybutadiene.

A second reactant employed in the formation of the polyurethane dispersion prepolymer is a polyisocyanate. Any compound which includes at least two isocyanate groups is within the contemplation of the present invention. It is preferable, however, that the polyisocyanate be a diisocyanate. Furthermore, although both aliphatic and aromatic polyisocyanates are within the contemplation of the present invention, it is preferred that the polyisocyanate be an aliphatic polyisocyanate. Thus, in a particularly preferred embodiment, the polyisocyanate is an aliphatic diisocyanate. Among particularly preferred aliphatic diisocyanates are isophorone diisocyanate, hexamethylene diisocyanate, methylene-4,4-bis(cyclohexyl)diisocyanate and mixtures thereof.

A final required reactant in the formation of the polyurethane prepolymer is a bis(hydroxyalkyl) quaternary ammonium group-containing diol. Diols within the contemplation of this constituent include N,N-dimethyl-bis(hydroxyethyl) quaternary ammonium methane sulfonate and N,N-dimethyl-bis(hydroxypropyl) quaternary ammonium methane sulfonate.

It is emphasized that additional components may be included among the reactants which produce the prepolymer of this invention. Among these optional components is an ester of a fatty acid having about 12 to about 20 carbon atoms containing hydroxyl groups. More preferably, the optional fatty acid ester containing hydroxyl groups has about 15 to about 20 carbon atoms. Most preferably, the fatty acid ester containing hydroxyl groups has about 18 carbon atoms. A particularly preferred class of fatty acid esters containing hydroxyl groups within the contemplation of this invention, are glycerol esters of stearic acid. For example, glycerol monostearate is particularly preferred as an optional component in the formation of the prepolymer of the polyurethane dispersion.

Another optional reactant in the formation of the prepolymer of the present invention is a hydroxylated polymer selected from the group consisting of a polyether polyol, a polyester polyol and mixtures thereof.

In the preferred embodiment wherein the optional hydroxylated polymer includes a polyether polyol, the polyether polyol is a polyalkylene glycol. Among preferred polyalkylene glycols are polyethylene glycol and polypropylene glycol. Of these, polypropylene glycol is particularly preferred.

In the preferred embodiment wherein the optional hydroxylated polymer comprises a polyester polyol, it is preferred that the polyester polyol be a polyester glycol. Preferred examples of polyester glycols include poly(hexamethylene adipate/isophthalate) glycol and poly(hexamethylene orthophthalate) glycol. Of these two glycols poly(hexamethylene adipate/isophthalate) glycol is particularly preferred.

Yet another optional preferred reactant employed in the synthesis of the prepolymer of the present invention is a polyepoxide. A particularly preferred polyepoxide is a diepoxide derived from bisphenol A.

It is emphasized that in those embodiments wherein a polyepoxide is utilized, the epoxide is limited to a concentration in the range of between about 1% and about 10% by weight, based on the total weight of the prepolymer components.

The prepolymer of the present invention is chain extended to produce the cationic polyurethane dispersion of the present invention. This chain extension occurs by reaction of the prepolymer with a chain extender. The chain extenders within the scope of the present invention are hydrazine or water.

The polyurethane dispersion of the present invention has particular application as a coating or adhesive composition. Such a composition is prepared by blending the polyurethane dispersion with a cationic polyolefin emulsion. A particularly preferred cationic polyolefin emulsion for use in these coatings or adhesive compositions is a polypropylene emulsion.

The following examples are given to illustrate the present invention. Because these examples are given for illustrative purposes only, the invention should not be deemed limited thereto.

EXAMPLE 1

Preparation of Polypropylene Glycol-Based Cationic Polyurethane Dispersion

Polypropylene glycol (123.4 g) having an average molecular weight of 1,000 (Poly® G 20-112, available from Arch Chemical); hydroxy-terminated polybutadiene having an average molecular weight of 2400 (40.9 g) (Poly BD® R45HTLO available from Elf Atochem); isophorone diisocyanate (IPDI) (82.7 g); and N,N-dimethyl-bis(hydroxyethyl) quaternary ammonium methane sulfonate (22.9 g); and 1-methyl-2-pyrrolidine (NMP) (30 g) were charged into a glass reactor equipped with an overhead stirrer and a temperature controller. The mixture was heated to about 80EC under a nitrogen atmosphere until the NCO content reached the calculated value of 4.8%, about 3 hours.

The thus formed prepolymer was then dispersed and chain extended by adding water (469.4 g) containing a defoamer (0.8 g) utilizing vigorous agitation until complete dispersion of the prepolymer was effected. The dispersion was allowed to remain at room temperature overnight for self extension. The final product was a stable dispersion having a solids content of 35% and a viscosity of 30 cps, as measured by a Brookfield ® LVF, spindle #3 at 60 rpm and 25EC.

A summary of Example 1 is included in Table 1.

EXAMPLE 2

Formation of Polyethylene Glycol-Based Cationic Polyurethane Dispersion

Example 1 was repeated, albeit with different concentrations of the same reactants that formed the prepolymer, with the exception that the hydroxylated polymer was polypropylene glycol (Poly® G20-56, available from Arch Chemical).

Table 1 includes a summary of this example.

EXAMPLE 3

Preparation of Polypropylene Glycol-Based Cationic Polyurethane Dispersion

Example 1 was identically reproduced but for differences in the concentrations of prepolymer constituents and a doubling of the concentration of the NMP solvent.

A summary of this example is included in Table 1.

EXAMPLE 4

Preparation of Phthalated Polyester Glycol-Based Cationic Polyurethane Dispersion Example 1 was reproduced utilizing the same components as employed therein, albeit in different concentrations, but for the hydroxylated polymer. Instead of hydroxylated polypropylene glycol, the polyurethane dispersion of Example 4 included a phthalated polyester glycol, Fomrez® 8066-72, available from Crompton Corp.

This example is summarized in Table 1.

EXAMPLE 5

Preparation of Polypropylene Glycol-Based Cationic Polyurethane Dispersion

Example 1 was reproduced utilizing the same components, although in different concentrations, including a doubling of the concentration of the NMP solvent.

A summary of this example is included in Table 1.

COMPARATIVE EXAMPLE 1

Formation of a Polypropylene Glycol-Based Cationic Polyurethane Dispersion

A cationic polyurethane dispersion, which includes the components recited in Example 1 but for the presence of the hydroxy-terminated polybutadiene.

This dispersion was tested along with the dispersions of Examples 1–5 in accordance with the following example. Thus, Comparative Example 1 is included in Table 1.

coating compositions were prepared by direct lending of each of the polyurethane dispersions of Examples 1 to 5 and Comparative Example 1 with a carboxylated polypropylene emulsion wherein equal amounts by weight of the polyurethane dispersion and carboxylated polypropylene emulsion were combined.

Each coating composition was applied to the surface of a ¹⁄₃₂ inch thick sheet of untreated polypropylene homopolymer. The coatings were applied using a Meyer rod #38 such that a wet thickness of about 0.0038 inch was coated onto the polypropylene sheets. The coatings were dried by exposing the coated sheets to 60EC for 30 minutes followed by exposing the coated sheets to 120EC for 30 minutes.

The coated sheets were heat-sealed onto uncoated ¹⁄₆₄ inch thick nylon sheets by disposing the nylon sheets over the coated polypropylene sheets and imposing a temperature and pressure of 177EC and 60 psi for 30 seconds. The nylon sheets were then peeled off the polypropylene sheets at a separation rate of 2 inches per minute in accordance with ASTM Test Procedure D1876.

The results of this peel adhesion test are set forth in Table 2.

TABLE 2

| Polyurethane Dispersion of | Peel Strength of Ex. 6, pli |
|---|---|
| Example 1 | Not tested |
| Example 2 | 2.9 |
| Example 3 | 2.0 |
| Example 4 | 2.3 |
| Example 5 | 5.0 |
| Comparative Example 1 | 1.4 |

DISCUSSION OF RESULTS OF TABLE 2

The results of the adhesivity of polyurethane dispersion-containing coating compositions establish that those coating

TABLE 1

| Example No. | Hydroxylated Polymer, g | Polyalkadiene Polyol[1], g | Polyisocyanate[2], g | Quaternary Ammonium Diol[3], g | Solvent[4], % |
|---|---|---|---|---|---|
| 1 | Polypropylene glycol[5], 41.14 | 13.65 | 27.56 | 7.65 | 10 |
| 2 | Polypropylene glycol[6], 27.80 | 27.80 | 17.67 | 6.02 | 20 |
| 3 | Polypropylene glycol[5], 29.08 | 15.66 | 26.41 | 7.02 | 20 |
| 4 | Phthalated polyester glycol[7], 29.40 | 29.40 | 22.90 | 8.21 | 10 |
| 5 | Polypropylene glycol[5], 24.52 | 24.52 | 23.31 | 7.65 | 20 |
| CE 1 | Polypropylene glycol[5], 38.89 | 0 | 33.12 | 5.56 | 17.47 |

[1]Poly BD ® R45HTLO hydroxy-terminated polybutadiene having an average molecular weight of 2,400.
[2]Isophorone diisocyanate (IPDI).
[3]N,N-dimethyl bis(hydroxyethyl) quaternary ammonium methane sulfonate.
[4]1-methyl-2-pyrrolidinone.
[5]Poly ® G20-112, a product of Arch Chemical.
[6]Poly ® G20-56, a product of Arch Chemical
[7]Fomrez ® 8066-72, a product of Crompton Corp.

EXAMPLE 6

Peel Adhesion Test Using A Blend of a Polyurethane Dispersion and a Polyolefin Emulsion Each of the polyurethane dispersions of Examples 1 to 5 and Comparative Example 1 were blended with a polyolefin emulsion to produce a coating composition. Specifically, compositions prepared in accordance with the present invention, as manifested by the peel adhesion test, were clearly superior to the closest prior art polyurethane dispersion coating composition.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A cationic polyurethane dispersion comprising a reaction product of a prepolymer and a chain extender, said prepolymer comprising a reaction product of a hydroxylated polyalkadiene, a bis(hydroxyalkyl) quaternary ammonium group-containing diol and a polyisocyanate.

2. A dispersion in accordance with claim 1 wherein said chain extender is selected from the group consisting of hydrazine and water.

3. A dispersion in accordance with claim 1 wherein said hydroxylated polyalkadiene is a hydroxylated polybutadiene.

4. A dispersion in accordance with claim 1 wherein said hydroxylated polyalkadiene is partially or completely hydrogenated.

5. A dispersion in accordance with claim 3 wherein said hydroxylated polybutadiene is partially or completely hydrogenated.

6. A dispersion in accordance with claim 1 wherein said bis(hydroxyalkyl) quaternary ammonium-group-containing diol is N,N-dimethyl-bis(hydroxyethyl) quaternary ammonium methane sulfonate.

7. A dispersion in accordance with claim 1 wherein said polyisocyanate is a diisocyanate.

8. A dispersion in accordance with claim 7 wherein said diisocyanate is an aliphatic diisocyanate.

9. A dispersion in accordance with claim 8 wherein said aliphatic diisocyanate is selected from the group consisting of isophorone diisocyanate, hexamethylene diisocyanate, methylene-4,4-bis(cyclohexyl)diisocyanate and mixtures thereof.

10. A dispersion in accordance with claim 9 wherein said aliphatic diisocyanate is isophorone diisocyanate.

11. A dispersion in accordance with claim 1 wherein said prepolymer reaction product comprises an ester of a fatty acid having about 12 to about 20 carbon atoms containing hydroxyl groups.

12. A dispersion in accordance with claim 11 wherein said ester is glycerol monostearate.

13. A dispersion in accordance with claim 1 wherein said prepolymer reaction product comprises a hydroxylated polymer selected from the group consisting of a polyether polyol, a polyester polyol and mixtures thereof.

14. A dispersion in accordance with claim 13 wherein said hydroxylated polymer is a polyether polyol, said polyether polyol selected from the group consisting of polyethylene glycol and polypropylene glycol.

15. A dispersion in accordance with claim 14 wherein said polyether polyol is polypropylene glycol.

16. A dispersion in accordance with claim 13 wherein said hydroxylated polymer is a polyester glycol.

17. A dispersion in accordance with claim 16 wherein said polyester glycol is selected from the group consisting of poly(hexamethylene adipate/isophthalate) glycol and poly(hexamethylene or orthophthalate) glycol.

18. A dispersion in accordance with claim 1 wherein said prepolymer reaction product comprises an ester of a fatty acid having about 12 to about 20 carbon atoms containing hydroxyl group and a hydroxylated polymer selected from the group consisting of a polyether polyol, a polyester polyol and mixtures thereof.

19. A dispersion in accordance with claim 1 wherein said prepolymer reaction product comprises a polyepoxide.

20. A dispersion in accordance with claim 19 wherein said polyepoxide is a diepoxide derived from bisphenol A.

21. A composition comprising a blend of said dispersion of claim 1 and a cationic polyolefin emulsion.

22. A composition in accordance with claim 21 wherein said cationic polyolefin emulsion is a polypropylene emulsion.

* * * * *